United States Patent [19]

Daoud

[11] Patent Number: 5,363,440

[45] Date of Patent: Nov. 8, 1994

[54] MULTILAYERED TYPE NETWORK INTERFACE UNIT

[75] Inventor: Bassel H. Daoud, Township of Parsippany-Troy Hills, Morris County, N.J.

[73] Assignee: AT&T Bell Laboratories, Murray Hill, N.J.

[21] Appl. No.: 40,772

[22] Filed: Mar. 31, 1993

[51] Int. Cl.$^5$ ............................................. H04M 1/00
[52] U.S. Cl. .................................. 379/399; 379/412; 379/413
[58] Field of Search .................. 379/399, 412, 413

[56] References Cited

U.S. PATENT DOCUMENTS

| | | | |
|---|---|---|---|
| 4,800,588 | 1/1989 | Poster, Jr. | 379/399 |
| 4,860,350 | 8/1989 | Smith . | |
| 4,907,986 | 3/1990 | Muller . | |
| 4,945,559 | 7/1990 | Collins et al. | 379/399 |
| 4,945,560 | 7/1990 | Collins et al. | 379/399 |
| 4,949,376 | 8/1990 | Nieves et al. | 379/399 |
| 5,004,433 | 4/1991 | Daoud . | |
| 5,153,910 | 10/1992 | Mickelson et al. . | |

OTHER PUBLICATIONS

U.S. Patent Application of Baker et al., Ser. No. 07/874,319 filed Apr. 27, 1992.

*Primary Examiner*—James L. Dwyer
*Assistant Examiner*—Jacques H. Saint-Surin
*Attorney, Agent, or Firm*—Lester H. Birnbaum

[57] ABSTRACT

Disclosed is a network interface unit which comprises a multilayer modular design. The upper layer includes an array of customer bridges. The lower layer includes a splice chamber and a protector panel. The splice chamber includes openings which permit a plurality of units to be stacked. The upper layer is removably mounted to the lower layer so it can be used with existing building entrance protectors which have no interface section.

7 Claims, 3 Drawing Sheets

MULTILAYERED TYPE NETWORK INTERFACE UNIT

BACKGROUND OF THE INVENTION

This invention relates to telecommunications apparatus and, in particular, to network interface units and building entrance protector units.

Network interface units constitute the demarcation between the customer's equipment and the telephone network. In buildings including multiple subscribers, the interface unit is typically mounted in a basement and includes an array of customer bridges, each bridge being coupled to an individual subscriber line. The bridges are coupled to the phone network through an RJ11 jack and plug so that the customer can plug a working phone into the jack to determine if any problems lie in the customer or network side of the telecommunications system.

Network interface units typically also include a building entrance protector portion which comprises a cable splice chamber and a protector field for providing surge protection for each customer. Such units usually require a large amount of wall space, which may not be readily available, especially if additional units are required to increase capacity.

Many buildings presently include only a building entrance protector unit without the network interface portion. When it is desired to upgrade the unit, the customer is generally forced to buy a completely new unit including both protector and network interface portions.

SUMMARY OF THE INVENTION

The invention in one aspect is a network interface unit for servicing a multiplicity of subscribers. The unit comprises a bottom portion including a splice chamber and an array of protector devices mounted thereon. The splice chamber includes wiring means for connecting a cable to the protectors. The unit further includes a top portion including an array of customer bridges, each adapted for coupling to a different subscriber line. The array of bridges is coupled to the protector array through at least one removable electrical connector. The top portion is mounted to the bottom portion by means including a hinged member so that the top portion may be opened to reveal the bottom portion. The mounting means also includes fasteners so that the top portion is removably mounted to the bottom portion.

In accordance with another aspect, the invention is a network interface module for servicing a plurality of subscribers and adapted for mounting over a building entrance protector unit. The interface module comprises an array of customer bridges, each adapted for coupling to a different subscriber line. The module also includes an electrical connector for coupling the bridges to a protector array in the protector unit. The interface module is mounted to a hinged member which, in turn, is adapted for mounting by means of fasteners to the building entrance protector unit.

BRIEF DESCRIPTION OF THE DRAWING

These and other features of the invention are delineated in detail in the following description. In the drawing.

It will be appreciated that, for purposes of illustration, these figures are not necessarily drawn to scale.

DETAILED DESCRIPTION

Figure 1:
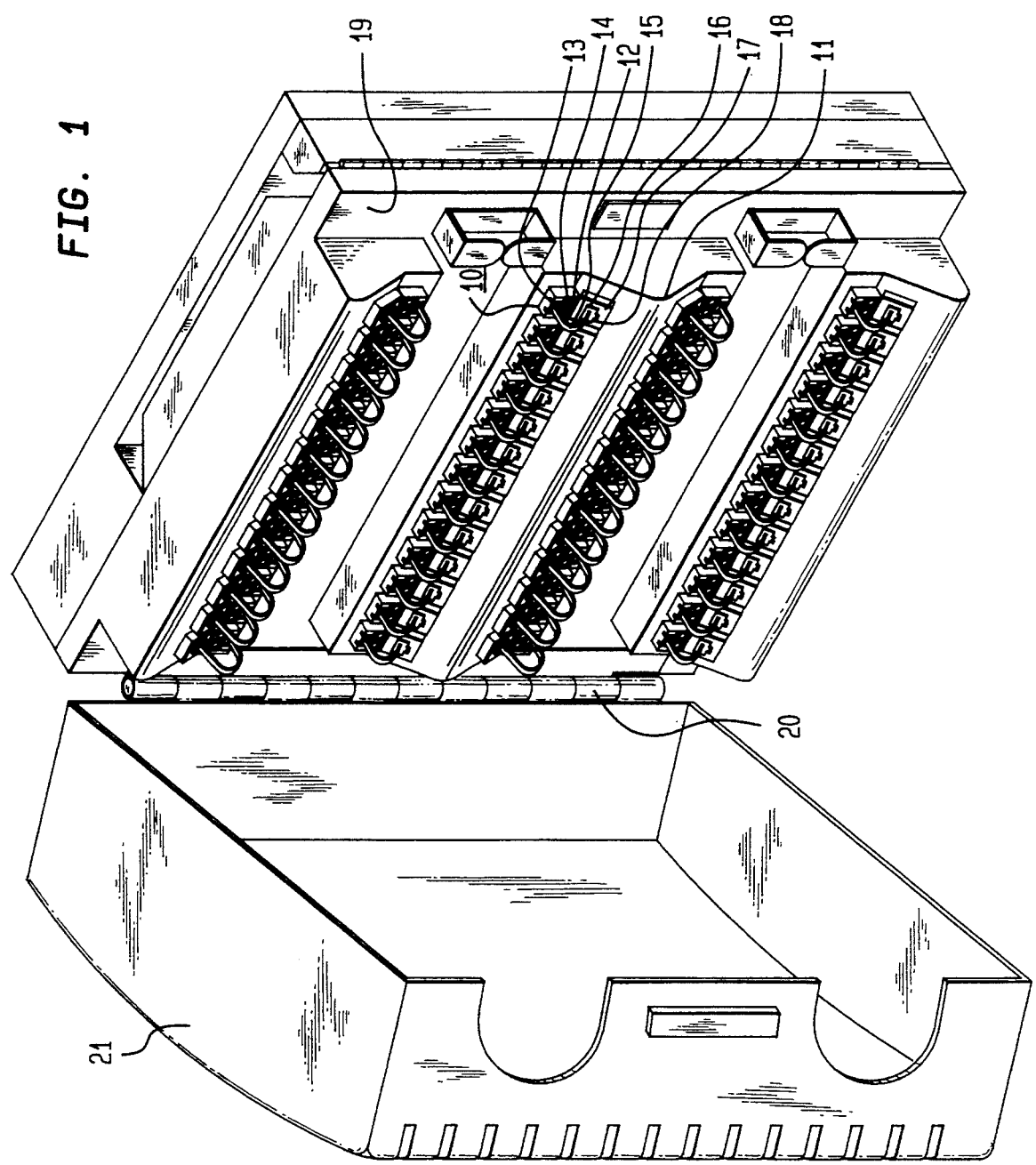
FIG. 1 is a front perspective view of a network interface unit in accordance with an embodiment of the invention.

FIG. 1 illustrates primarily the network interface module of the unit in accordance with the invention. An array of customer bridges, e.g., 10, are mounted within respective holes in a chassis 11. Each bridge includes a connector portion 12 which comprises a pair of screws, 13 and 14, electrically coupled to the customer's equipment by means of wires (not shown). The screws 13 and 14 are also electrically coupled to a pair of wires (not shown) formed within a protective jacket 15, which emerges from the body of the connector 12. The wires terminate in a standard RJ11 plug 16. (For an example of a connector unit which may be used in a network interface unit, see U.S. Pat. No. 5,004,433 issued to Daoud.)

Adjacent to each connector portion 12 is a bridge assembly 17 which includes a jack 18 for receiving the RJ11 plug 16. The bridge assembly is electrically coupled to the telecommunications network through standard wiring and electrical connectors, to be described, and can include such additional components as a maintenance termination unit. (For an example of a bridge assembly which can be used with the present invention, see U.S. patent application of Baker et al., Ser. No. 07/874,319, filed Apr. 27, 1992.)

The chassis, e.g., 11, are mechanically secured to a base number 19. Also secured to the base member 19 by means of a hinged member 20 is a cover 21 so that the cover can protect the customer bridges. Typically, the cover may be opened by any of the subscribers in the building to gain access to the customer bridges.

Figure 2:
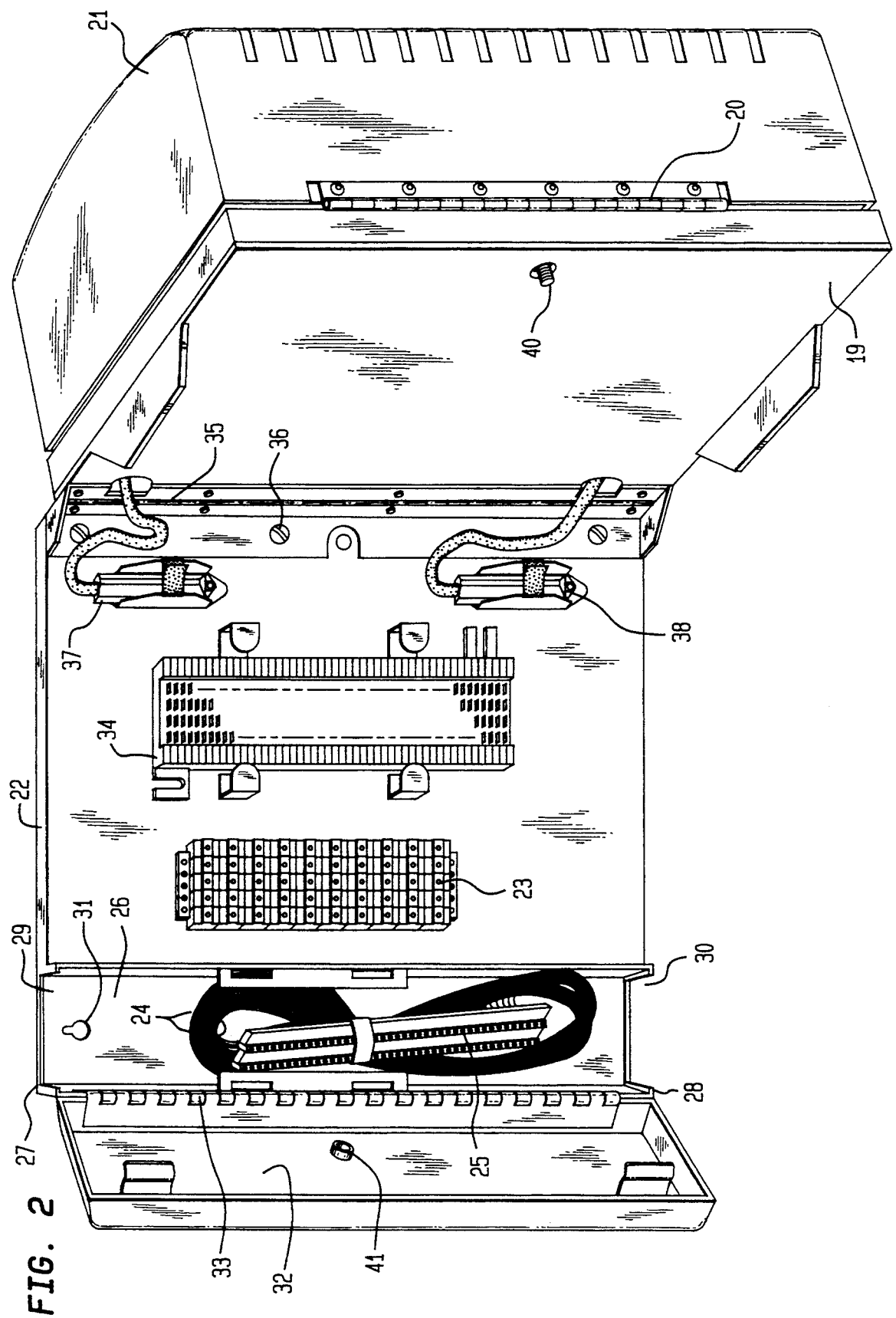
FIG. 2 is a front perspective view of another portion of the network interface unit of FIG. 1.

FIG. 2 illustrates the bottom portion of the unit, which basically comprises the building entrance protector module, in combination with the previously described network interface module. This protector module also includes a base member 22 on which is mounted an array of protector devices, e.g., 23. Each protector device 23 is typically a solid state surge arrester which is plugged into a socket (not shown) mounted to the base member 22. The array of protectors is electrically coupled to a bundle of wires 24 which terminate in a splice connector 25.

The splice connector 25 and the major portion of the wire bundle 24 are situated within a splice chamber 26 which is located adjacent to the base member 22. The chamber includes top and bottom surfaces 27 and 28 which each include a port, 29 and 30 respectively, permitting a cable (not shown) to enter through one surface of the splice chamber and exit at the opposite surface. This feature permits a plurality of the units shown in FIGS. 1 and 2 to be stacked in a vertical direction in the orientation shown. The back wall of the splice chamber includes a hole 31 which permits wall mounting of the unit. A cover 32 is mounted by means of a hinged member 33 to the splice chamber to protect the splices formed therein.

Also mounted on the base member 22 is a cross-connect or tapping field 34. Such fields, which are standard in the art, include an array of connectors, each coupled between a protector and an associated customer bridge. By applying jumper cables (not shown) to the connectors, connections can be changed between protectors and customer bridges when, for example, a customer changes his or her location in the building.

The base member 19 of the network interface module is mounted to a hinged member 35 which, in turn, is removably mounted to the base member 22 of the protector module by fasteners, which in this case are screws such as 36. Electrical connection of the jacks (e.g., 18, of FIG. 1) in the network interface module to the protector and cross-connect field wiring behind base 22 is provided by means of removable electrical connectors 37 and 38. The connectors can be standard pin and socket type connectors. In this example, the socket is mounted to the base member 22 and includes receptacles for receiving and electrically engaging pins in the plug, the plug being electrically coupled to wiring which is electrically connected to the array of jacks in the customer bridges.

The network interface module also includes a screw 40, the bottom portion of which is visible in FIG. 2. The screw extends through the base member 19 of the interface module and is received by a screw receptacle 41 when the cover 32 of the splice chamber 26 is closed and the interface module is rotated on the hinged member 35 to cover the protector module. The screw 40 is typically a security screw which can be turned only by a specially designed screwdriver available to telephone personnel.

The unit illustrated in FIGS. 1 and 2, therefore, is a multilayer design which includes an interface module in the top layer and a protector module in the bottom layer. The interface module is mounted by means of hinged member 35 so that in normal operation the interface module completely covers the protector module, but can be swung open as illustrated in FIG. 2 to provide access to the protector module by an appropriate craftsperson. Further, the interface module is electrically and mechanically removable from the protector module. This permits the interface module to be sold as a stand-alone unit to customers who already have a protector unit similar to the protector module shown. Such customers can mount the interface module over or adjacent to their existing protector units.

Figure 3:
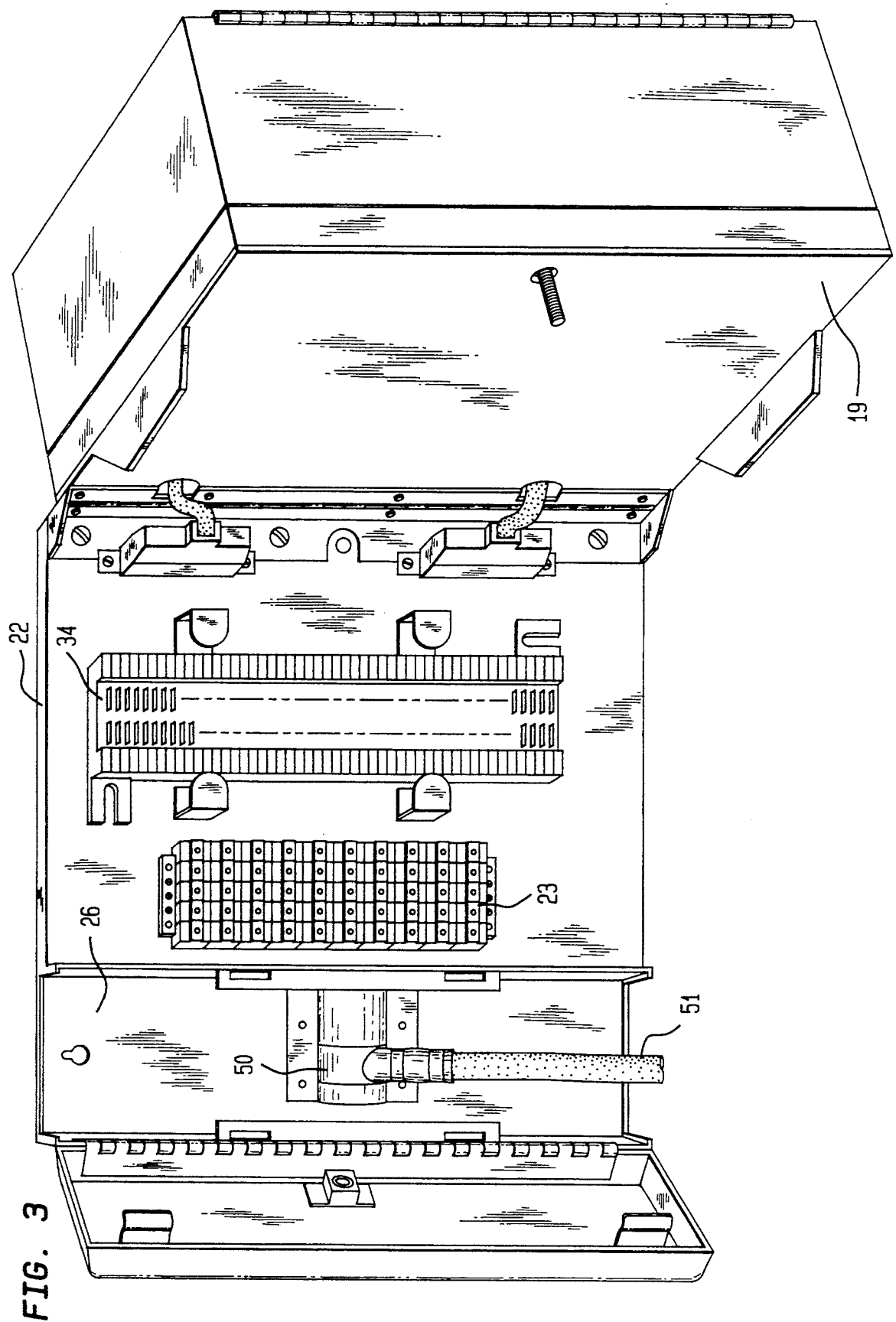
FIG. 3 is a front perspective view of a network interface unit in accordance with a further embodiment.

FIG. 3 illustrates a protector module in accordance with an alternative embodiment of the invention. Similar elements have been similarly numbered. Here, the splice connector, 25 of FIG. 2, has been replaced by a swivel stub connector 50, which is mounted to the back wall of the splice chamber 26. The cable 51 is electrically coupled to the connector 50 and is shown cut away for purposes of illustration.

Various additional modifications will become apparent to those skilled in the art. All such variations which basically rely on the teachings through which the invention has advanced the an are properly considered within the scope of the invention.

I claim:

1. A network interface unit for servicing a multiplicity of subscribers, said unit comprising:
    a bottom portion including a splice chamber and an array of protector devices mounted thereon, said splice chamber including wiring means for connecting a cable to said protectors; and
    a top portion including an array of customer bridges, each adapted for coupling to a different subscriber line, the bridge array being coupled to said protector array through at least one removable electrical connector, said top portion being mounted to the bottom portion by means including a hinged member so that the top portion may be opened to reveal the bottom portion, and the mounting means including fasteners so that the top portion is removably mounted to the bottom portion.

2. The unit according to claim 1 further comprising a cross-connect device mounted to the bottom portion and electrically connected between the protector devices and the removable connector.

3. The unit according to claim 1 wherein the wiring means includes a splice connector electrically connected thereto to permit the cable to be spliced to the wiring means.

4. The unit according to claim 1 wherein the wiring means includes a swivel stub connector electrically coupled to the wiring and mounted within the splice chamber.

5. The unit according to claim 1 further comprising a screw extending from the top portion to a screw receptacle in the bottom portion such that the top portion can be opened only when the screw is removed from the screw receptacle.

6. The unit according to claim 1 wherein the splice chamber includes ports on opposite surfaces thereof to permit the cable to enter and exit the chamber.

7. A network interface module for servicing a plurality of subscribers and adapted for mounting over a building entrance protector unit, the interface module comprising:
    an array of customer bridges, each adapted for coupling to a different subscriber line;
    an electrical connector for coupling the bridges to a protector array in the protector unit; and
    a hinged member mounted to the interface module and adapted for mounting by means of fasteners to the building entrance protector unit.

* * * * *